US006997223B2

(12) United States Patent
Naito

(10) Patent No.: US 6,997,223 B2
(45) Date of Patent: Feb. 14, 2006

(54) MOUNTING STRUCTURE OF TIRE MONITORING DEVICE

(75) Inventor: Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 272 days.

(21) Appl. No.: 10/686,635

(22) Filed: Oct. 17, 2003

(65) Prior Publication Data

US 2004/0089389 A1 May 13, 2004

(30) Foreign Application Priority Data

Oct. 28, 2002 (JP) ...................................... 2002-312935

(51) Int. Cl.
*B60C 17/02* (2006.01)

(52) U.S. Cl. ...................... 152/520; 73/146.5; 152/158; 152/400; 152/340; 152/447

(58) Field of Classification Search ................. 152/516, 152/518, 519, 520, 158, 165, 396, 152, 400, 152/152.1, 156, 110.1, 292, 304.2, 304.3, 152/304.5; 340/445, 442, 447; 73/146.5; 29/600, 601
See application file for complete search history.

(56) References Cited

U.S. PATENT DOCUMENTS 6,462,650 B1 * 10/2002 Balzer et al. ............... 340/442
6,668,884 B1 * 12/2003 Koch et al. .............. 152/152.1
6,805,176 B1 * 10/2004 Kuramori et al. ........... 152/156
6,843,289 B1 * 1/2005 Shimura et al. ............ 152/156

FOREIGN PATENT DOCUMENTS

JP 10-297226 A1 11/1998
JP 2001-163020 A1 6/2001
JP 2001-519279 A1 10/2001

* cited by examiner

*Primary Examiner*—Frantz F. Jules
(74) *Attorney, Agent, or Firm*—Rader, Fishman & Grauer PLLC

(57) ABSTRACT

Disclosed is a mounting structure of a tire monitoring device, in which communication failures due to a conductive support core member can be prevented. The tire monitoring device which transmits information of the inside of a tire by using radio waves is mounted on a conductive support core member which is placed within the cavity of a pneumatic tire and is formed in a hollow structure over a peripheral portion of a rim. At this time, the tire monitoring device is disposed on a sidewall of the support core member or in a channel on a load support surface of the support core member, and a transmission antenna of the tire monitoring device is disposed outside of the support core member.

5 Claims, 4 Drawing Sheets

MOUNTING STRUCTURE OF TIRE MONITORING DEVICE

BACKGROUND OF THE INVENTION

The present invention relates to a structure of mounting a tire monitoring device on a support core member which enables run-flat traveling. More particularly, the present invention relates to a mounting structure of a tire monitoring device, in which communication failures caused by a conductive support core member are prevented.

In response to demands in the market, numerous techniques have been proposed to allow a vehicle to run in an emergency for a certain distance even when a pneumatic tire is punctured while the vehicle is running. Some of these proposed techniques (such as the one disclosed in Published Japanese Translation of a PCT Application No. 2001-519279) enable run-flat traveling by inserting a hollow-structured support core member into the cavity of a pneumatic tire assembled to a rim, and supporting a flat tire by the support core member.

It is difficult for a driver to have an immediate grasp of puncture conditions in a tire/wheel assembly with a run-flat function. Therefore, a tire monitoring device typified by a pressure warning device is generally provided together with the run-flat function. The tire-monitoring device is attached to a rim well or the like and transmits information of the inside of a tire detected by a sensor to a receiver on a vehicle through an antenna (refer to Published Japanese Translation of a PCT Application No. Hei 8-505939, for example).

However, it has been problematic that communication failures easily occur if the tire monitoring device is disposed on the rim well and the hollow-structured support core member is made of a conductive material. Because of this, information of the inside of the tire cannot be received.

SUMMARY OF THE INVENTION

An object of the present invention is to provide a mounting structure of a tire monitoring device, in which communication failures due to a conductive support core member can be prevented.

The novel mounting structure of a tire monitoring device for achieving the above object is a structure of mounting a tire monitoring device on a conductive support core member which is placed within the cavity of a pneumatic tire and formed to have a hollow structure over a peripheral portion of a rim. The tire monitoring device transmits information of the inside of a tire by using radio waves. This mounting structure is characterized in that the tire monitoring device is disposed on a sidewall of the support core member and a transmission antenna of the tire monitoring device is disposed outside of the support core member.

Another novel mounting structure of a tire monitoring device for achieving the above object is a structure of mounting a tire monitoring device on a conductive support core member which is placed within the cavity of a pneumatic tire and formed to have a hollow structure over a peripheral portion of a rim. The tire monitoring device transmits information of the inside of a tire by using radio waves. This mounting structure is characterized in that a load support surface in a peripheral portion of the support core member has a channel hollowed in an outside-to-inside direction, the tire monitoring device is placed within the channel, and a transmission antenna of the tire monitoring device is disposed outside of the support core member.

In this way, the tire monitoring device is disposed at a position where the tire monitoring device does not interfere with the pneumatic tire during run-flat traveling, while the transmission antenna of the device is disposed outside of the support core member. Therefore, communication failures do not occur even if the support core member is made of a conductive material, and thereby information of the inside of the tire can be received without fail.

In addition, once the tire monitoring device is attached to the support core member in advance, a work to attach the tire monitoring device on a rim well is no longer required. It is also possible to avoid a disadvantage that the tire monitoring device falls from the well during tire-to-rim fit.

It is preferable that the above-mentioned antenna comprises a conductive antenna base and an insulating cover, and that the antenna is stuck on an outer surface of the support core member. In this case, the antenna located outside of the support core member does not interfere with a work to assemble the pneumatic tire and the support core member.

Further, when the antenna is disposed on the load support surface in the peripheral portion of the support core member, the tire monitoring device is enabled to function as a warning device which notifies a limit of run-flat traveling. Specifically, if the antenna is broken due to run-flat traveling, Transmission from the tire monitoring device is lost. Therefore, the time point of the transmission loss can be taken as an index of the run-flat traveling limit.

DETAILED DESCRIPTION OF THE PREFERRED EMBODIMENTS

Hereinafter, the present invention will be detailed with reference to the attached drawings.

Figure 1:
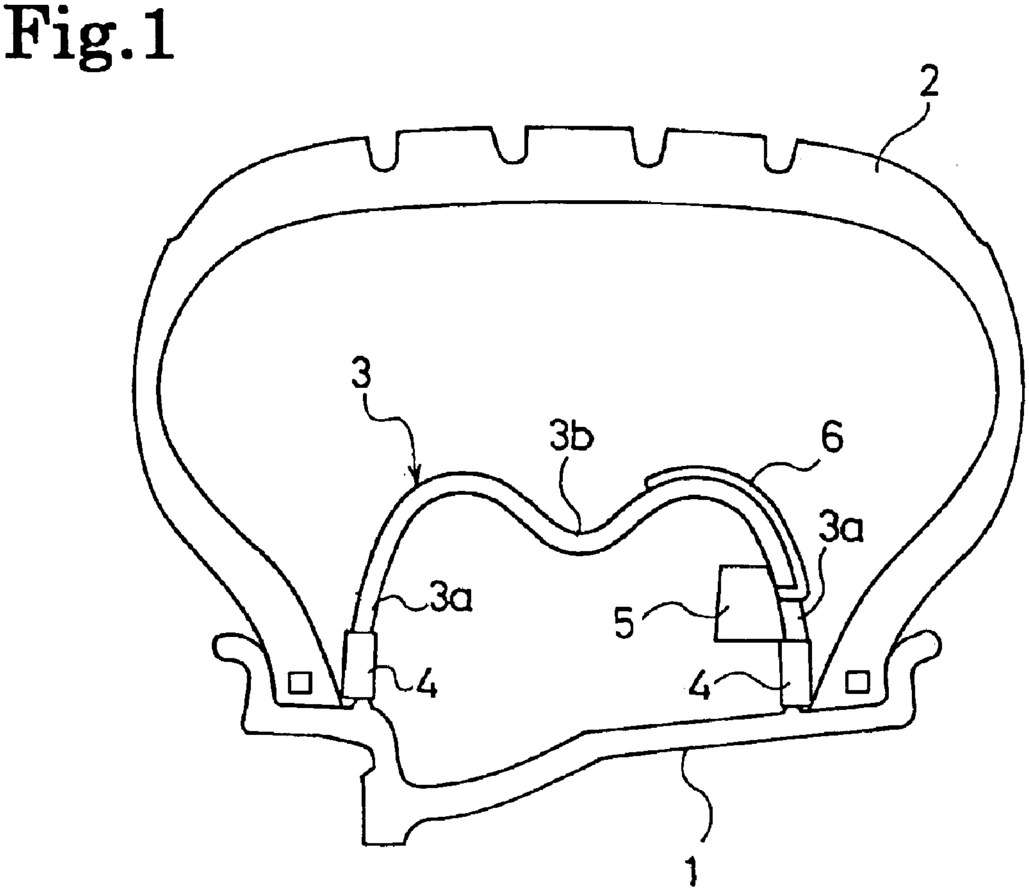
FIG. 1 is a cross-sectional view depicting a mounting structure of a tire monitoring device according to an embodiment of the present invention.

FIG. 1 shows a mounting structure of a tire monitoring device according to an embodiment of the present invention. The reference number 1 denotes a wheel rim, the reference number 2 denotes a pneumatic tire, and the reference number 3 denotes a run-flat support core member. Each of the rim 1, pneumatic tire 2, and support core member 3 is formed in a circular shape coaxially about the rotation axis of the wheel (not shown).

The support core member 3 is spaced apart from the inner wall of the pneumatic tire 2 under a normal driving condition, but supports the flattened pneumatic tire 2 from the inside of the tire when punctured. The support core member 3 has a continuous load support surface projecting toward the periphery of the tire to support the punctured tire, and has an open-leg-structure to form sidewalls 3*a* and 3*a* extending along the both sides of the load support surface. Additionally, the load support surface in a peripheral portion of the support core member 3 has a channel 3*b* hollowed in an outside-to-inside direction continuously formed along a core circumferential direction.

The support core member 3 is made of a rigid material since it has to support a vehicle weight through a flat pneumatic tire 2. The constituent material used for the support core member 3 is mainly metal. Examples for the metal are steel and aluminum, and the like.

Elastic rings 4 are attached to each of the sidewalls 3*a* and 3*a* of the support core member 3. These elastic rings 4 are adopted to support the support core member 3 while being abutted on bilateral rim seats. The elastic rings 4 not only mitigate impacts and vibrations that the support core member 3 receives from the flat pneumatic tire 2, but also prevent the support core member 3 from slipping on the rim seats to provide a stable support for the support core member 3.

A constituent material of the elastic rings 4 can be either rubber or resin, but rubber is particularly preferable. Examples of rubber types are natural rubber (NR), isoprene rubber (IR), styrene-butadiene rubber (SBR), butadiene rubber (BR), hydrogenated nitrile-butadiene rubber, hydrogenated stylene-butadiene rubber, ethylene propylene rubber (EPDM, EPM), isobutylene-isoprene rubber (IIR), acrylic rubber (ACM), chloroprene rubber (CR), silicone rubber and fluoro rubber.

The present invention is to provide a structure of mounting the tire monitoring device 5 on the conductive support core member 3 which is placed within the cavity of the pneumatic tire 2 and is formed in a hollow structure over the peripheral portion of the rim as mentioned earlier. This tire monitoring device 5 transmits information of the inside of the tire by using radio waves.

In FIG. 1, the tire monitoring device 5 is disposed on the inner side of the sidewall 3*a* of the support core member 3, and a transmission antenna 6 of the device is drawn to the outside of the support core member 3. The tire monitoring device 5 can be assembled to a hollow or opening portion formed in the sidewall 3*a* of the support core member 3, but has to be integrally fixed to the support core member 3 in any of the above cases. The antenna 6 drawn out to the outside of the support core member 3 is disposed to be extended to the load support surface in the peripheral portion of the support core member 3.

The tire monitoring device 5 incorporates various types of sensors and a transmitter. These sensors are for detecting information of the inside of the tire such as air pressure and temperature, and the transmitter is for transmitting the detection results of the sensors. To this transmitter, an antenna 6 is connected. The tire monitoring device 5 constantly detects the information of the inside of the pneumatic tire 2 and transmits the detection results to a receiver on a vehicle through the antenna 6.

Figure 2:
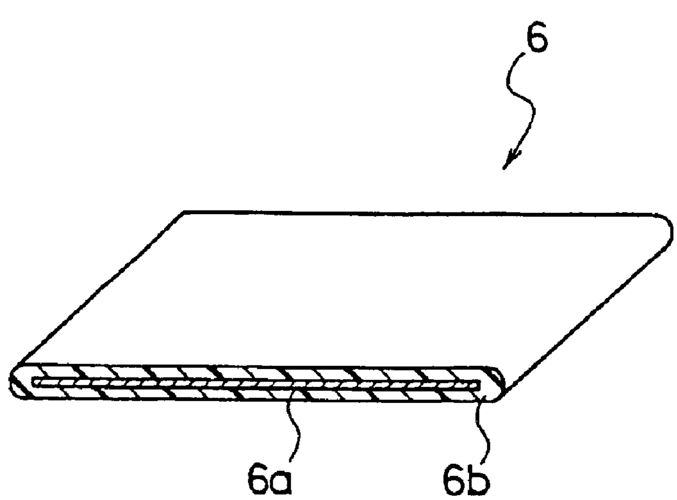
FIG. 2 is a perspective cross-sectional view depicting an example of a film-shaped antenna.

The antenna 6 can be a film-shaped antenna as illustrated in FIG. 2. In FIG. 2, the antenna 6 comprises a patterned conductive antenna base 6*a* and an insulating cover 6*b*, which are formed in a film shape. For the cover 6*b*, resin or rubber can be used. If the antenna 6 configured in this way is stuck to the outer surface of the support core member 3, the antenna 6 located outside of the support core member 3 will not interfere a work such as to assemble the pneumatic tire 2 and the support core member 3.

In the foregoing mounting structure of the tire monitoring device, the tire monitoring device 5 does not interfere with the pneumatic tire 2 even when the pneumatic tire 2 is flattened during run-flat traveling. In addition, the antenna 6 of the tire monitoring device 5 is disposed outside of the conductive support core member 3. Therefore, communication failures do not occur and thereby information of the inside of the tire can be received without fail.

Moreover, since the tire monitoring device 5 is attached to the support core member 3 in advance, a work to attach the tire monitoring device 5 to the well of the rim 1 is no longer required. In addition, it is possible to avoid a disadvantage that the tire monitoring device 5 falls from the well during tire-to-rim fit.

Furthermore, the antenna 6 is disposed on the load support surface in the peripheral portion of the support core member 3. Therefore, the tire monitoring device 5 is enabled to function as a warning device which notifies a run-flat traveling limit. Specifically, if the antenna 6 contacts the pneumatic tire 2 on and off during run-flat traveling, the cover 6*b* serving as a protecting layer of the antenna 6 is gradually broken, and thereby the antenna 6 ultimately stops functioning. Then, transmission of the information of the inside of the tire from the tire monitoring device 5 is lost, and thus the time point of the transmission loss can be taken as an index of the run-flat traveling limit. In this case, it is possible to arbitrarily adjust a distance for that a vehicle continues run-flat traveling until the antenna 6 is broken based on the thickness or material of the cover 6*b* of the antenna 6.

Figure 3:
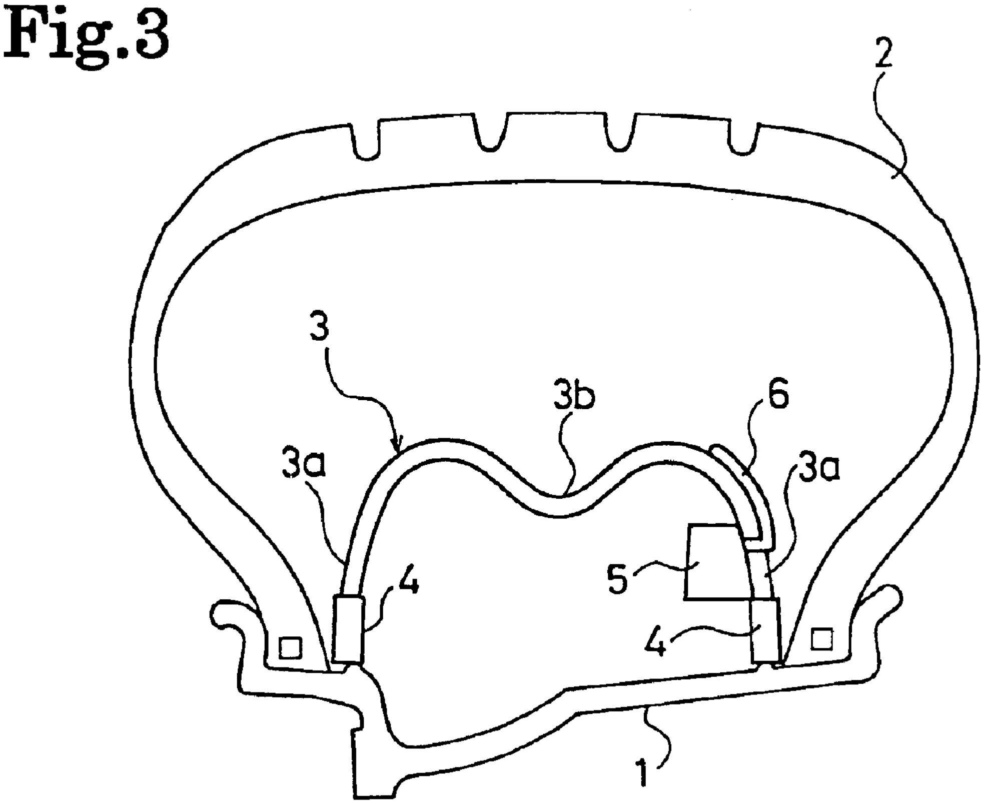
FIG. 3 is a cross-sectional view depicting a mounting structure of a tire monitoring device according to another embodiment of the present invention.

FIG. 3 shows a mounting structure of a tire monitoring device according to another embodiment of the present invention. In this embodiment, a tire monitoring device 5 is disposed on a sidewall 3*a* of a support core member 3 and a transmission antenna 6 is disposed outside of the support core member 3. Here, the antenna 6 is not disposed on a load support surface in a peripheral portion of the support core member 3. Therefore, the antenna 6 is hardly damaged by run-flat traveling.

Figure 4:
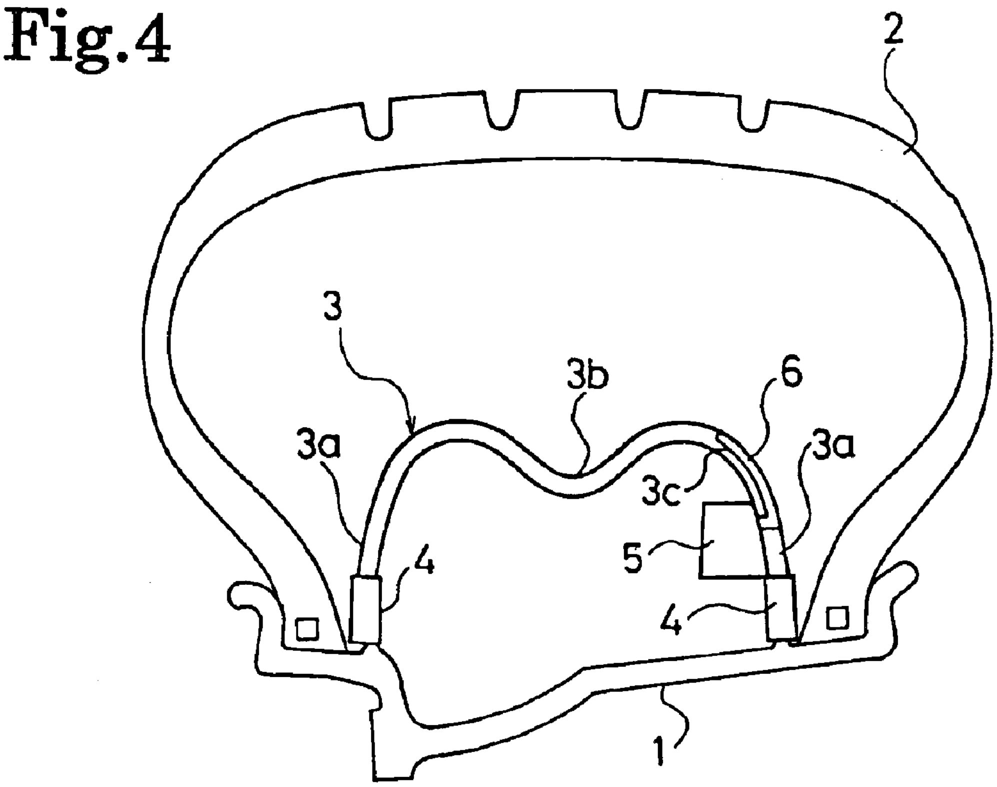
FIG. 4 is a cross-sectional view depicting a mounting structure of a tire monitoring device according to yet another embodiment of the present invention.

FIG. 4 shows a mounting structure of a tire monitoring device according to another embodiment of the present invention. In this embodiment, a tire monitoring device 5 is disposed on a sidewall 3*a* of a support core member 3 and a transmission antenna 6 is disposed outside of the support core member 3. Here, the antenna 6 is not disposed on a load support surface in a peripheral portion of the support core member 3. In addition, a region in the support core member 3 where the antenna is disposed is formed to have a step 3*c* in which the antenna 6 is accommodated. Accordingly, the antenna 6 can be protected during run-flat traveling.

Figure 5:
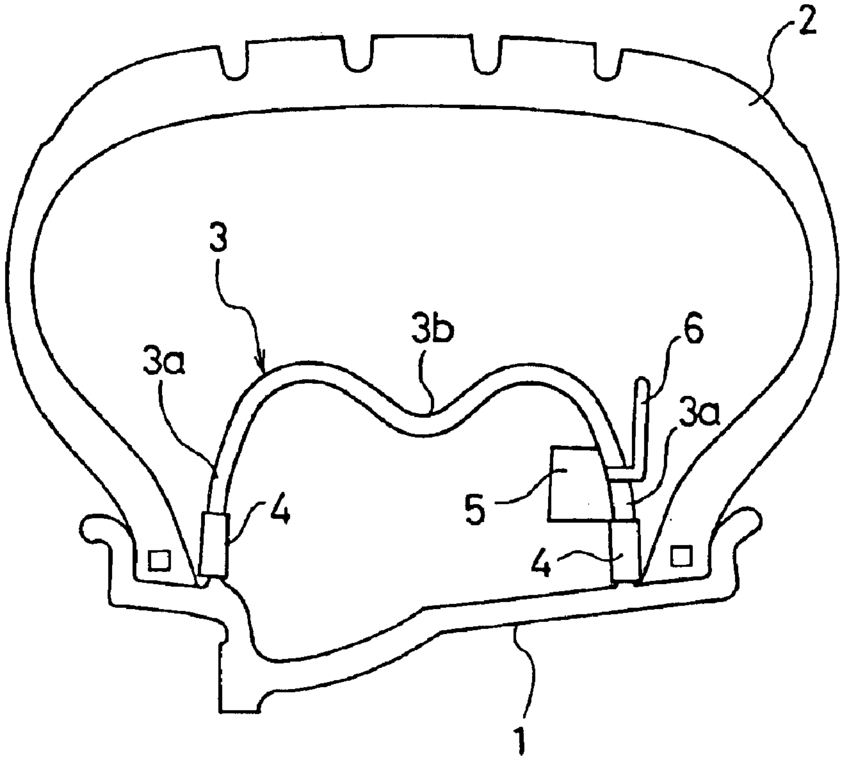
FIG. 5 is a cross-sectional view depicting a mounting structure of a tire monitoring device according to yet another embodiment of the present invention.

FIG. 5 shows a mounting structure of a tire monitoring device according to yet another embodiment of the present invention. In this embodiment, a tire monitoring device 5 is disposed on a sidewall 3*a* of a support core member 3 and a transmission antenna 6 is disposed outside of the support core member 3. Here, a rod antenna is employed for the antenna 6.

Figure 6:
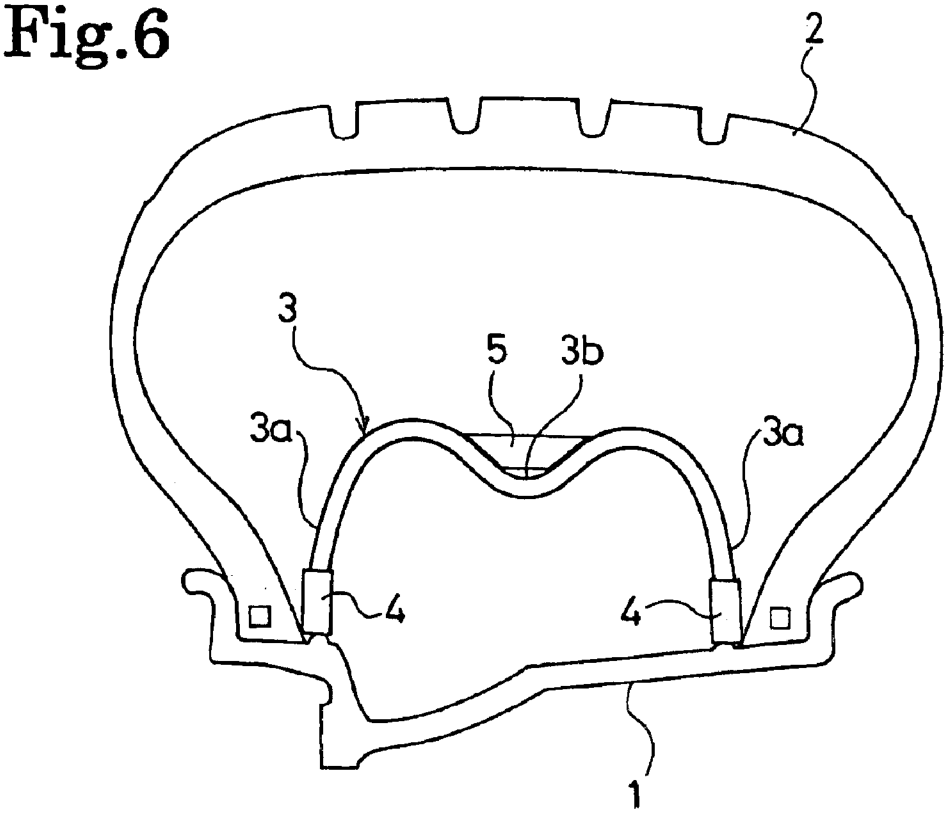
FIG. 6 is a cross-sectional view depicting a mounting structure of a tire monitoring device according to yet another embodiment of the present invention.

FIG. 6 shows a mounting structure of a tire monitoring device according to yet another embodiment of the present invention. In this embodiment, a tire monitoring device 5 with a built-in antenna is disposed in a channel 3*b* formed on a load support surface in a peripheral portion of a support core member 3.

Figure 7:
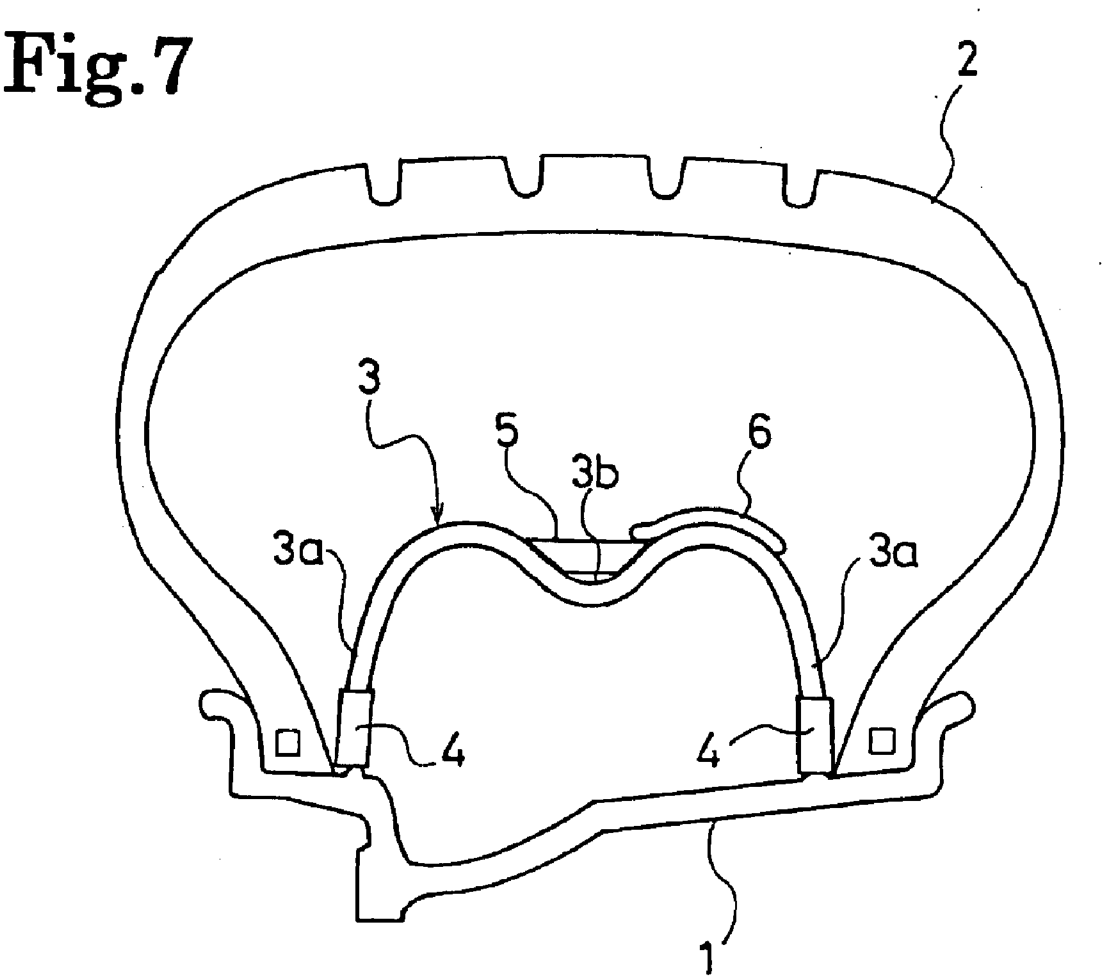
FIG. 7 is a cross-sectional view depicting a mounting structure of a tire monitoring device according to yet another embodiment of the present invention.

FIG. 7 shows a mounting structure of a tire monitoring device according to yet another embodiment of the present invention. In this embodiment, a tire monitoring device 5 is disposed in a channel 3*b* formed on a load support surface in a peripheral portion of a support core member 3, and a transmission antenna 6 is disposed outside of the support core member 3. The antenna 6 is extended to the load support surface in the peripheral portion of the support core member 3.

When the tire monitoring device 5 is disposed in the channel 3*b* of the support core member 3, the tire monitoring device 5 is maintained to be at the inner side of the peaks of the load support surface of the support core member 3, when viewed in a core radial direction. Thus, the tire monitoring device 5 does not come to contact with the pneumatic tire 2 during run-flat traveling, which is preferable.

EXAMPLE

Tire/wheel assemblies, each including a pneumatic tire with a tire size of 205/55R16 89V and a wheel with a rim size of 16×6 1/2JJ, were prepared. In each of the tire/wheel assemblies, a hollow-structured support core member made of a 1.0 mm-thick steel plate was placed within the cavity of the pneumatic tire. The only difference between these tire/wheel assemblies was a mounting structure of a tire monitoring device. Specifically, in the example of the present invention as shown in FIG. 1, the tire monitoring device was disposed on a sidewall of the support core member and a transmission antenna of the device was disposed outside of the support core member. In the tire/wheel assembly of a conventional example, the tire monitoring device was attached to a rim well together with the antenna.

Using these tire/wheel assemblies, tests were conducted outside of the pneumatic tires to receive radio waves from the tire monitoring devices. As a result, significant communication failures were observed when using the tire/wheel assembly of the conventional example, whereas almost no communication failures occurred in the tire/wheel assembly of an example of the present invention.

According to the present invention, a tire monitoring device which transmits information of the inside of a tire by using radio waves is mounted on a conductive support core member which is placed within the cavity of a pneumatic tire and is formed to have a hollow structure over a peripheral portion of a rim. At this time, the tire monitoring device is disposed on a sidewall of the support core member or in a channel on a load support surface of the support core member, and the transmission antenna of the tire monitoring device is disposed outside of the support core member. Accordingly, communication failures due to the conductive support core member are prevented, thus making it possible to receive information of the inside of the tire without fail.

The preferred embodiments of the present invention have been hitherto described in detail. It should be understood that various modifications, substitutions and replacements can be made without departing from the spirit and scope of the present invention as defined by the appended claims.

What is claimed is:

1. A mounting structure of a tire monitoring device in which the tire monitoring device transmitting information of an inside of a tire by using radio waves is mounted on a conductive support core member which is placed within a cavity of a pneumatic tire and is formed in a hollow structure over a peripheral portion of a rim, wherein the tire monitoring device is disposed on a sidewall of the support core member and a transmission antenna of the tire monitoring device is disposed outside of the support core member.

2. The mounting structure of a tire monitoring device according to claim 1, wherein the antenna comprises a conductive antenna base and an insulating cover, and the antenna is stuck on an outer surface of the support core member.

3. A mounting structure of a tire monitoring device in which the tire monitoring device transmitting information of an inside of a tire by using radio waves is mounted on a conductive support core member which is placed within a cavity of a pneumatic tire and is formed in a hollow structure over a peripheral portion of a rim, wherein a load support surface in a peripheral portion of the support core member has a channel hollowed in an outside-to-inside direction, the tire monitoring device is disposed in the channel, and a transmission antenna of the tire monitoring device is disposed outside of the support core member.

4. The mounting structure of a tire monitoring device according to claim 2, wherein the antenna comprises a conductive antenna base and an insulating cover, and the antenna is stuck on an outer surface of the support core member.

5. The mounting structure of a tire mounting device according to any one of claims 1 to 4, wherein the antenna is disposed on a load support surface in a peripheral portion of the support core member.

* * * * *